United States Patent
Lenz et al.

(10) Patent No.: US 12,330,994 B2
(45) Date of Patent: Jun. 17, 2025

(54) CVD FUNCTIONALIZED PARTICLES FOR CMC APPLICATIONS

(71) Applicant: Raytheon Technologies Corporation, Farmington, CT (US)

(72) Inventors: Brendan M. Lenz, Wethersfield, CT (US); Sarah A. Frith, Jupiter, FL (US); Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 970 days.

(21) Appl. No.: 17/390,072

(22) Filed: Jul. 30, 2021

(65) Prior Publication Data

US 2023/0036697 A1 Feb. 2, 2023

(51) Int. Cl.
*C04B 35/628* (2006.01)
*C04B 35/64* (2006.01)
*C04B 35/657* (2006.01)
*C04B 35/80* (2006.01)

(52) U.S. Cl.
CPC ........ *C04B 35/80* (2013.01); *C04B 35/62802* (2013.01); *C04B 35/62844* (2013.01); *C04B 35/62884* (2013.01); *C04B 35/62892* (2013.01); *C04B 35/64* (2013.01); *C04B 35/657* (2013.01); *C04B 2235/3217* (2013.01); *C04B 2235/3244* (2013.01); *C04B 2235/3821* (2013.01); *C04B 2235/3826* (2013.01); *C04B 2235/3873* (2013.01); *C04B 2235/422* (2013.01); *C04B 2235/428* (2013.01); *C04B 2235/5244* (2013.01); *C04B 2235/5252* (2013.01); *C04B 2235/614* (2013.01); *C04B 2235/616* (2013.01)

(58) Field of Classification Search
CPC ........ C04B 35/62802; C04B 35/62844; C04B 35/62884; C04B 35/62892; C04B 35/64; C04B 35/657; C04B 35/80; C04B 2235/422; C04B 2235/428; C04B 2235/5244; C04B 2235/5252; C04B 2235/614; C04B 2235/616
See application file for complete search history.

(56) References Cited

U.S. PATENT DOCUMENTS

| | | | |
|---|---|---|---|
| 6,596,040 B2 | 7/2003 | Saak et al. | |
| 10,443,386 B2 * | 10/2019 | Matsumoto | C04B 35/6263 |
| 10,822,281 B2 | 11/2020 | She et al. | |
| 2006/0057287 A1 | 3/2006 | Foss et al. | |
| 2020/0157011 A1 * | 5/2020 | Schmidt | C04B 35/5607 |

\* cited by examiner

*Primary Examiner* — Michael P Wieczorek
(74) *Attorney, Agent, or Firm* — Kinney & Lange, P.A.

(57) ABSTRACT

A method of manufacturing ceramic matrix composites includes producing chemical vapor deposition functionalized ceramic particles before injecting the functionalized ceramic particles into the CMC fabric. The functionalized ceramic particles are mixed with a binder solution and then dispensed into voids present between adjacent tows of the CMC fabric. Injecting the particles in the center of the voids reduces the size and volume fraction of the voids/defects, improving the homogeneity of surface texture, homogeneity of microstructure, and part model shape conformity.

8 Claims, 4 Drawing Sheets

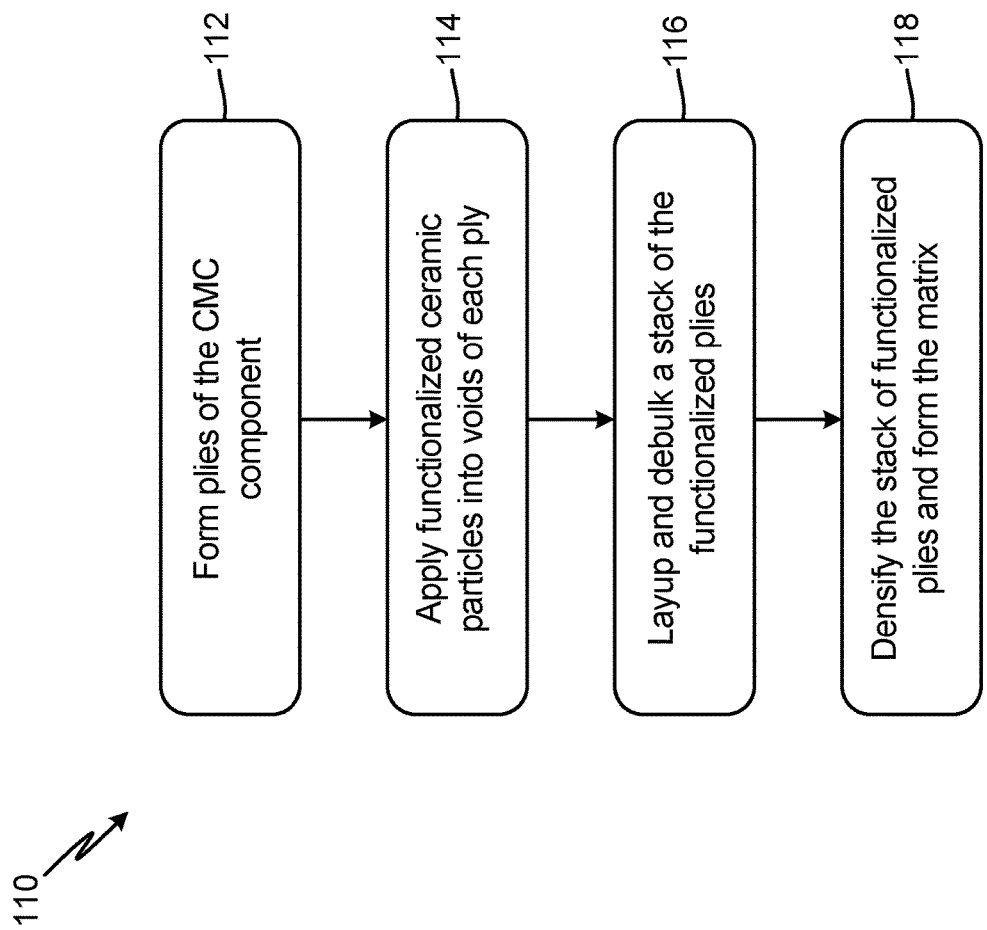

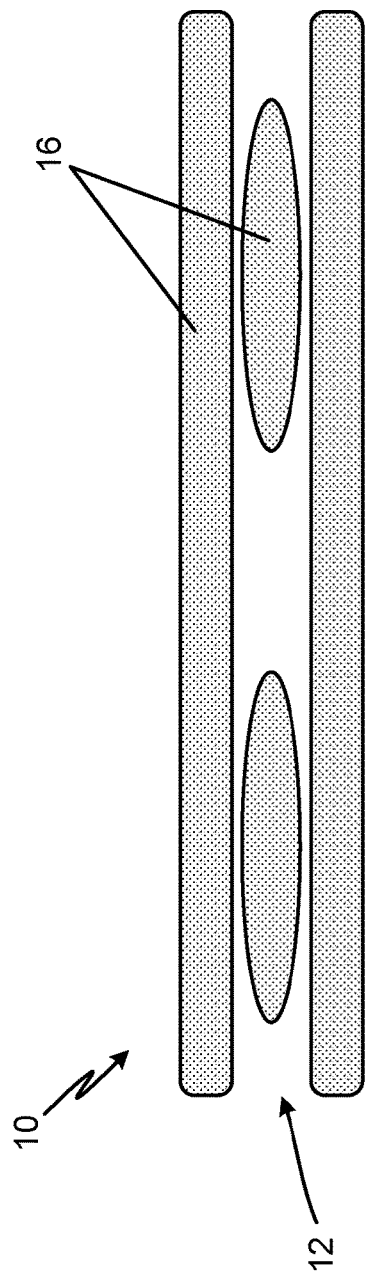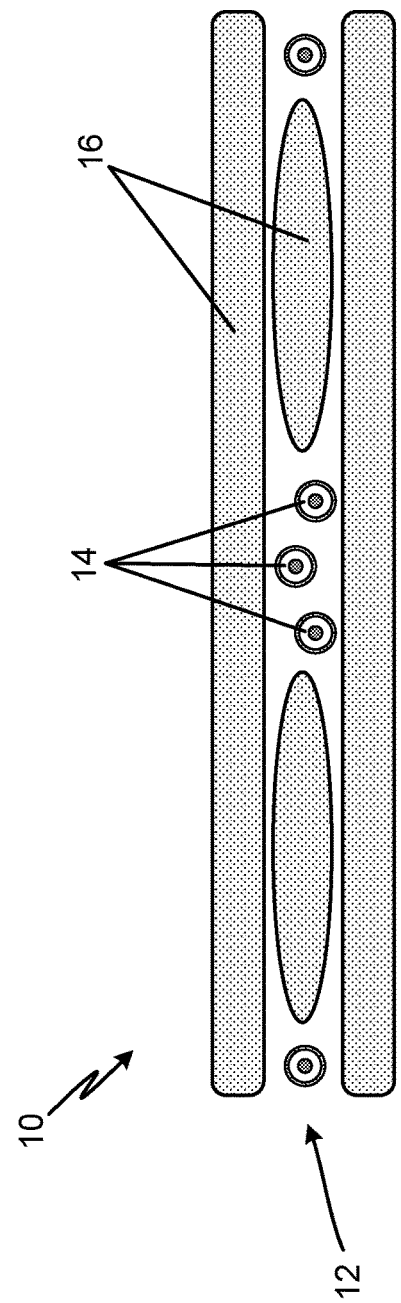

CVD FUNCTIONALIZED PARTICLES FOR CMC APPLICATIONS

BACKGROUND

The present invention relates to the fabrication of ceramic matrix composites and, more particularly, to a ceramic matrix composite having improved properties for operating in gas turbine engines.

Ceramic matrix composites are desirable for use in gas turbine engines due to their unique material properties including high temperature and oxidation resistance capabilities, high strength and creep resistance, high thermal conductivity, and low weight. During manufacture of the ceramic matrix composite components, voids are created between adjacent tows of the ceramic matrix composite component due to the cross-sectional shape of each individual tow. The voids are considered a defect in the ceramic matrix composite component because the voids create areas of weakness and reduced thermal resistance, among other issues. Reducing these defects prior to matrix formation helps facilitate uniform density of the final component, which is critical to its performance, durability, and functionality.

SUMMARY

According to one aspect of the disclosure, a method of forming a ceramic matrix composite component is disclosed. The method includes forming a plurality of ceramic fiber plies; selectively applying functionalized ceramic particles into voids within each of the plurality of ceramic fiber plies; laying up and debulking a stack of the plurality of ceramic fiber plies including the functionalized ceramic particles; and subsequently densifying the stack of ceramic fiber plies.

According to another aspect of the disclosure, a ceramic matrix composite component includes a plurality of ceramic fiber plies and a plurality of functionalized ceramic particles. Each of the plurality of ceramic fiber plies comprises a plurality of interconnected tows. The plurality of functionalized ceramic particles are positioned within voids between adjacent tows of each of the plurality of ceramic fiber plies. The functionalized ceramic particles comprise base ceramic particles coated with a first chemical compound.

BRIEF DESCRIPTION OF THE DRAWINGS

FIG. 1A is a flow chart illustrating steps of a method for manufacturing ceramic matrix composites.

FIG. 3A is a cross-sectional view of a ceramic matrix composite component without functionalized ceramic particles.

FIG. 3B is a cross-sectional view of a ceramic matrix composite component including functionalized ceramic particles.

DETAILED DESCRIPTION

A method of manufacturing ceramic matrix composites (CMC) includes producing chemical vapor deposition (CVD) functionalized ceramic particles before injecting the functionalized ceramic particles into the CMC fabric. The functionalized ceramic particles are mixed with a binder solution and then dispensed into voids present between adjacent tows of the CMC fabric. Injecting the functionalized ceramic particles in the center of the voids reduces the size and volume fraction of the voids/defects, improving the homogeneity of surface texture, homogeneity of microstructure, and part model shape conformity, among other mechanical properties.

Figure 1C:
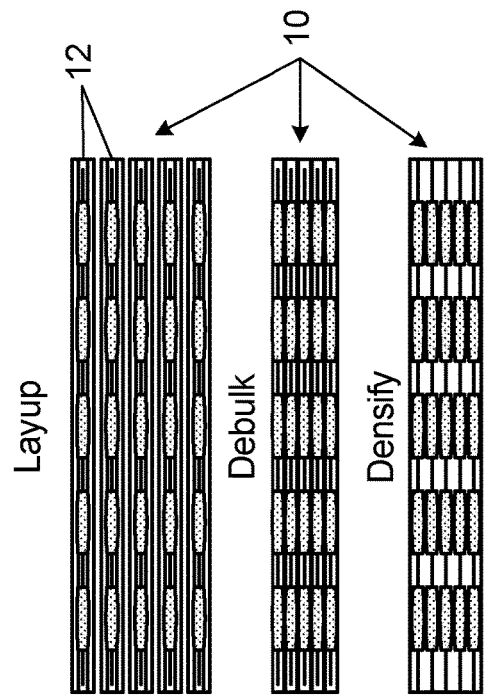
FIG. 1C is a cross-sectional view of an example ceramic matrix composite layup across multiple process stages.
Figure 1B:
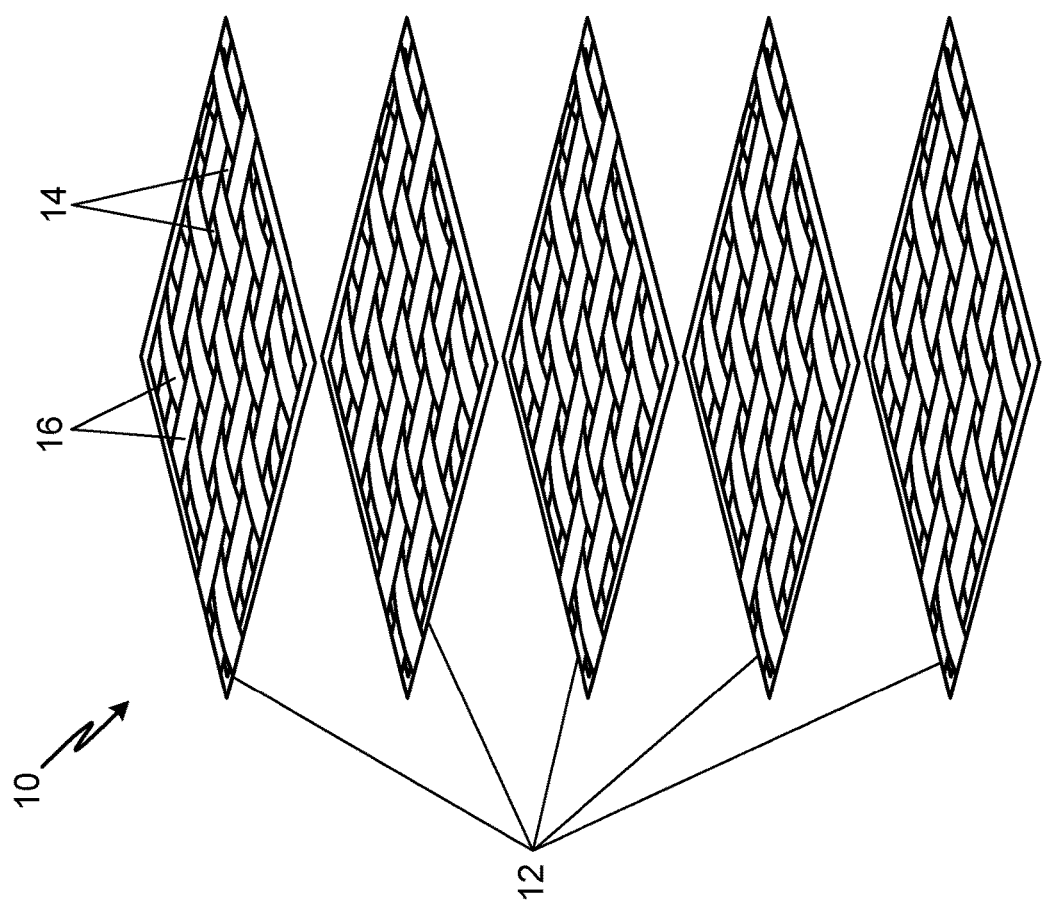
FIG. 1B is a perspective view of an example ceramic matrix composite layup including multiple plies.

FIG. 1A is a flow chart illustrating steps of method 110 for manufacturing ceramic matrix composite 10 (hereinafter "CMC 10"). FIG. 1B is a perspective view of an example CMC 10 layup including multiple plies 12. FIG. 1C is a cross-sectional view of an example CMC 10 layup across multiple process stages. FIGS. 1A-1C will be discussed together. Method 110 includes steps 112, 114, 116, and 118. Step 112 includes forming a plurality of ceramic fiber plies 12. Step 114 includes selectively applying functionalized ceramic particles 14 into voids within each of the plurality of ceramic fiber plies 12. Step 116 includes laying up and debulking a stack of the plurality of ceramic fiber plies 12 including the functionalized ceramic particles 14. Step 118 includes subsequently densifying the stack of ceramic fiber plies 12. Each of steps 112, 114, 116, and 118 of method 110 will be discussed in detail.

At step 112, the plurality of ceramic fiber plies 12 are formed. As shown in FIG. 1B, CMC 10 can be constructed from one or more plies 12 arranged in a desired manner. As used herein, the term "ply" can be interchangeable with terms such as "sheet" and "fabric". Plies 12 can be formed from braided, woven, and/or non-woven ceramic fibers or tows 16, which in an exemplary embodiment, can be formed from silicon carbide. Other suitable ceramics are contemplated herein. Plies 12 can further be formed from unidirectional and/or multidirectional (including randomly oriented) fibers or tows 16. Exemplary plies 12 can have 5-harness or 8-harness weave or braided patterns. For a given CMC 10 formed from multiple plies 12, plies 12 can, but need not be uniform in their design (e.g., composition, thickness, shape, etc.). In the embodiment shown in FIG. 1B, CMC 10 includes five plies 12 that are stacked, debulked, and densified to produce the final CMC 10. In another embodiment, CMC 10 can include more or less than five plies 12 that are stacked, debulked, and densified to produce the final CMC 10, discussed below. Further, CMC 10 can be a net shape or near-net shape and be a two or three-dimensional structure.

At step 114, the functionalized ceramic particles 14 can be selectively applied and/or injected into voids within each of the plurality of ceramic fiber plies 12. Once an individual ply 12 of CMC 10 is formed, functionalized ceramic particles 14 can be selectively applied to reduced fiber regions and/or voids between adjacent tows of ply 12. Functionalized ceramic particles 14 can be applied or injected into voids between adjacent tows 16 of ply 12 using one or more of a pipette, syringe, nozzle, or other dispensing apparatus. Functionalized ceramic particles 14 can range in size from about 10 micrometers to about 100 micrometers, depending on the size of tows 16 used to construct ply 12. Functionalized ceramic particles 14 can be a homogeneous or heterogenous mixture of generally spherical, elongate, or otherwise irregularly shaped particles, discussed in detail regarding FIGS. 2A-2B. Further, functionalized ceramic particles 14 can be in an aqueous suspension that can further include a polyvinyl alcohol and water solution or a polyvinyl butyral and ethanol solution, among other suitable binder solutions. The particle loading of the suspension can range from 10 percent to 30 percent, and in an exemplary embodiment, from 20 percent to 25 percent. In other words, a mixture of functionalized ceramic particles 14 and a liquid binder (e.g. polyvinyl alcohol and water solution or a polyvinyl butyral and ethanol solution) can be injected into the voids within each ceramic fiber ply 12 to fill the voids and improve the mechanical and thermal properties of CMC 10. In any embodiment, application of functionalized ceramic particles 14 in voids between adjacent tows 16 of ply 12 can occur in one or multiple successive iterations to achieve the desired result.

At step 116, the stack of the plurality of ceramic fiber plies 12 with the injected functionalized ceramic particles 14 proceeds through the process steps of layup and debulk. At step 118, the stack of ceramic fiber plies 12 is densified. After selectively applying functionalized ceramic particles 14 to reduced fiber regions and/or voids between adjacent tows 16 of each ply 12, the individual plies 12 are stacked on top of each other and compressed to debulk CMC 10 and remove voids/spaces between individual plies 12 of CMC 10. For example, the debulking step will reduce voids/spaces between individual plies 12 of CMC 10 from a porosity greater than 80% by volume before debulking to a porosity less than about 70% following debulking and, in some examples, to about 50% following debulking. Debulking can be accomplished with any technique commonly used for debulking stacked plies, such as applying pressure, for example pressures of about 1 psi to about 50 psi, at room temperature or an elevated temperature up to about 250° F. Once debulked, CMC 10 can undergo matrix formation and densification using a chemical vapor infiltration (CVI) or chemical vapor deposition (CVD) process using techniques known in the art.

During densification, plies 12 are infiltrated by reactant vapors, and a gaseous matrix material precursor deposits on the fibers. The matrix material can be a silicon carbide or other suitable ceramic material. Densification is carried out under appropriate pressure (for example, from about 0.1 psi to 10 psi) and temperature (from room temperature to about 2,000° F.) until the resulting CMC 10 has reached the desired residual porosity. For example, the resulting CMC 10 may have a residual porosity of about 10% to about 30% by volume. In an alternative embodiment, densification can include other methodologies including but not limited to melt infiltration (MI) and polymer infiltration and pyrolysis (PIP). The resulting CMC 10 components have desirable mechanical and thermal properties for harsh operating environments like the hot section of a gas turbine engine. Other aerospace applications include exhaust systems, ducting, shrouds, and sealing systems. Method 110 can also be used to produce CMC 10 components for maritime, power generation, and industrial applications.

The CMC 10 layup process discussed above can include additional steps (inter-step or post processing) that were not described regarding FIGS. 1A-1C. For example, various post-processing steps can be performed, such as the application of one or more protective coatings (e.g., environmental and/or thermal barrier coatings). A bond coat can also be applied to facilitate bonding between CMC 10 and a protective coating. Other protective coatings, especially those suitable for use in a gas turbine engine environment, are contemplated herein. Various inter-step processes can also be performed, such as the application of a tackifier to plies 12 at any point in the layup process. Other inter-step processes like surface preparation and cleaning are contemplated herein.

Figure 2B:
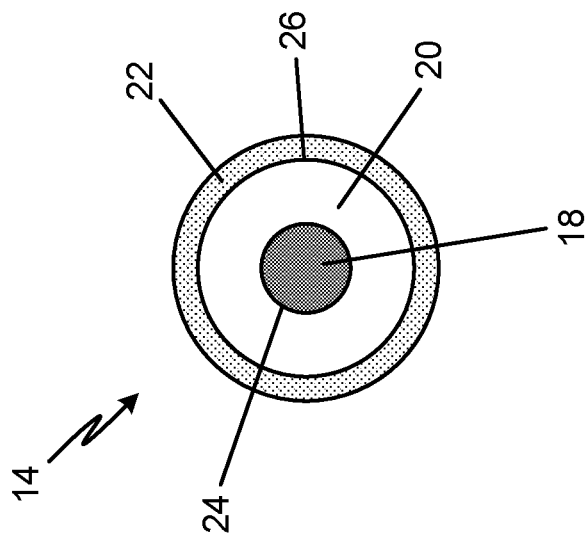
FIG. 2B is a cross-sectional view of an example functionalized ceramic particle.
Figure 2A:
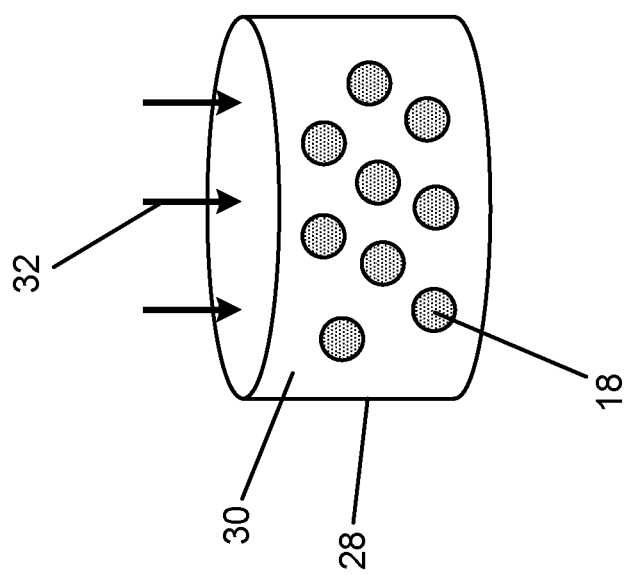
FIG. 2A is a perspective view of the production of functionalized ceramic particles.

FIG. 2A is a perspective view of the production of functionalized ceramic particles 14. FIG. 2B is a cross-sectional view of an example functionalized ceramic particle 14. FIGS. 2A-2B will be discussed together. Functionalized ceramic particles 14 are ceramic particles that include at least base ceramic particle 18 and first chemical compound 20. In some examples, as shown in FIG. 2B, functionalized ceramic particles 14 can include base ceramic particle 18, first chemical compound 20, and second chemical compound 22. In other examples, functionalized ceramic particles 14 can include three or more chemical compound layers stacked on top of each other and extending radially outward from a center of base ceramic particle 18. As such, functionalized ceramic particles 14 can be any ceramic particle including base ceramic particle 18 with at least one chemical compound adhered to base exterior 24 of base ceramic particle 18.

As shown in FIG. 2B, an embodiment of functionalized ceramic particle 14 can include base ceramic particle 18, first chemical compound 20, and second chemical compound 22. Base ceramic particle 18 is the innermost layer or core of functionalized ceramic particle 14 in which chemical compounds are adhered. In some examples, base ceramic particle 18 can be a generally spherical, elongate, or otherwise irregularly shaped particle and have a primary (i.e., largest) dimension of about 0.010 mm to about 0.100 mm. Further, base ceramic particle 18 can be formed from one or more of silicon carbide, boron carbide, silicon nitride, silicon, carbon, aluminum oxide, or hafnium oxide, to name a few non-limiting examples. Base ceramic particle 18 includes base exterior 24, which is the outermost surface of base ceramic particle 18.

First chemical compound 20 is adhered to base exterior 24 of base ceramic particle 18. First chemical compound 20 can be formed from one or more of silicon carbide (SiC), boron nitride (BN), silicon boron nitride (SiBN), carbon (C), boron carbide ($B_4C$), aluminum nitride (AlN), aluminum oxide ($Al_2O_3$), zirconium dioxide ($ZrO_2$), silicon nitride ($Si_3N_4$), silicon dioxide ($SiO_2$), and silicon oxycarbide (SiOC). In the embodiment shown in FIG. 2B, first chemical compound 20 includes first exterior 26, which is the outermost surface of first chemical compound 20. In some examples, second chemical compound 22 can be adhered to first exterior 26 of first chemical compound 20, discussed further below. Second chemical compound 22 can be formed from one or more of silicon carbide (SiC), boron nitride (BN), silicon boron nitride (SiBN), carbon (C), boron carbide ($B_4C$), aluminum nitride (AlN), aluminum oxide ($Al_2O_3$), zirconium dioxide ($ZrO_2$), silicon nitride ($Si_3N_4$), silicon dioxide ($SiO_2$), and silicon oxycarbide (SiOC). Further, in some embodiments first chemical compound 20 can be the same chemical compound as second chemical compound 22. In other embodiments, first chemical compound 20 can be a different chemical compound than second chemical compound 22.

As shown in FIG. 2A, functionalized ceramic particles 14 are produced using a chemical vapor deposition (CVD) or a chemical vapor infiltration (CVI) process to adhere first chemical compound 20 to base ceramic particle 18. More specifically, a plurality of base ceramic particles 18 are placed in container 28 filled with fluidized bed 30, such that base ceramic particles 18 are suspended within fluidized bed 30. In some examples, fluidized bed 30 can include one or more of nitrogen ($N_2$), Argon (Ar), and hydrogen ($H_2$), among other inert or non-inert gases. The suspended base ceramic particles 18 are then deposited with reactant vapors 32, and a gaseous precursor deposits on base ceramic particles 18. The deposition process is carried out until the resulting first chemical compound 20 layer has reached the desired thickness on base exterior 24 of base ceramic particle 18. The thickness of first chemical compound 20 (including second chemical compound 22 and any subsequent chemical compound layers) can range from about 0.1 micrometers to about 100 micrometers, depending on the material/chemical compound used for each layer and the desired mechanical and thermal properties of functionalized ceramic particles 14. As such, functionalized ceramic particles 14 are produced by coating base ceramic particles 18 with first chemical compound 20 through a chemical vapor deposition or chemical vapor infiltration process.

Similarly, a second layer can be added to functionalized ceramic particles 14 through a chemical vapor deposition or a chemical vapor infiltration process to adhere second chemical compound 22 to first chemical compound 20. After first chemical compound 20 is adhered to base ceramic particle 18, functionalized ceramic particle 14 is allowed to dry completely. Then functionalized ceramic particles 14 including base ceramic particles 18 and the adhered first chemical compound 20 are placed in container 28 filled with fluidized bed 30 and then deposited with reactant vapors 32, causing a gaseous precursor to deposit on first exterior 26 of first chemical compound 20. The deposition process is carried out until the resulting second chemical compound 22 layer has reached the desired thickness on first exterior 26 of first chemical compound 20. In some examples, second chemical compound 22 can have the same thickness as first chemical compound 20. In other examples, second chemical compound 22 can have a different thickness than first chemical compound 20.

Additionally, in some examples, second chemical compound 22 can be the same material/chemical compound as first chemical compound 20. In other examples, second chemical compound 22 can be a different material/chemical compound than first chemical compound 20. As such, functionalized ceramic particles 14 including two layers are produced by coating base ceramic particles 18 with first chemical compound 20 through a chemical vapor deposition or chemical vapor infiltration process, and then coating first chemical compound 20 with second chemical compound 22 through a chemical vapor deposition or chemical vapor infiltration process. Any number of additional chemical compound layers can be applied through the chemical vapor deposition or chemical vapor infiltration process to achieve the desired layered functionalized ceramic particles 14.

FIG. 3A is a cross-sectional view of CMC 10 without functionalized ceramic particles 14. FIG. 3B is a cross-sectional view of CMC 10 including functionalized ceramic particles 14. FIGS. 3A-3B will be discussed together. Referring to FIG. 3A, CMC 10 includes plies 12 constructed from a plurality of tows 16. More specifically, plies 12 can be formed from braided, woven, and/or non-woven ceramic fibers or tows 16, which in an exemplary embodiment, can be formed from silicon carbide. Due to the shape and size of the individual tows 16, voids or spaces are present between adjacent tows 16 of each ply 12. The voids or spaces are considered a defect in CMC 10 because the voids or spaces create areas of weakness and reduced thermal resistance, among other issues.

Referring to FIG. 3B, CMC 10 is shown after the layup, debulking, and densifying processes have occurred. CMC 10 includes functionalized ceramic particles 14 that were dispensed or injected into the voids or spaces between adjacent tows 16 of CMC 10. Functionalized ceramic particles 14 are injected in the voids between adjacent tows to improve the matrix properties of CMC 10. More specifically, functionalized ceramic particles 14 can improve density, matrix toughness, oxidation resistance, conductivity, and interlaminar properties of CMC 10. Further, the engineering of functionalized layers around ceramic particles 14 allows for the selection of both particle size and chemistry ratio for enhanced matrix infiltration and matrix properties. Depending on the spacing between adjacent tows 16, different sized functionalized ceramic particles 14 may be selectively chosen for desired seeding of a surface area/volume prior to the matrix infiltration process. In addition, different functional layers (different chemical compound layers) can provide enhanced matrix properties (such as matrix toughness) by intentionally adding strong or weak interfaces throughout the matrix volume. The properties of the constituents in the particle layers can alter the overall homogenized properties of the matrix. As such, injecting functionalized ceramic particles 14 in the center of the voids reduces the size and volume fraction of the voids/defects, improving the homogeneity of surface texture, homogeneity of microstructure, and part model shape conformity, among other mechanical and thermal properties.

Discussion of Possible Embodiments

The following are non-exclusive descriptions of possible embodiments of the present invention.

A method of forming a ceramic matrix composite component, the method comprising: forming a plurality of ceramic fiber plies; selectively applying functionalized ceramic particles into voids within each of the plurality of ceramic fiber plies; laying up and debulking a stack of the plurality of ceramic fiber plies including the functionalized ceramic particles; and subsequently densifying the stack of ceramic fiber plies.

The method of the preceding paragraph can optionally include, additionally and/or alternatively, any one or more of the following features, configurations and/or additional components:

Producing the functionalized ceramic particles by coating base ceramic particles with a first chemical compound through a chemical vapor deposition or chemical vapor infiltration process.

Coating the base ceramic particles with a second chemical compound through a chemical vapor deposition or chemical vapor infiltration process.

The first chemical compound is a same or different chemical compound than the second chemical compound.

The base ceramic particles can be one or more of silicon carbide, boron carbide, silicon nitride, silicon, carbon, aluminum oxide, and hafnium oxide.

The first chemical compound can be one or more of silicon carbide (SiC), boron nitride (BN), silicon boron nitride (SiBN), carbon (C), boron carbide ($B_4C$), aluminum nitride (AlN), aluminum oxide ($Al_2O_3$), zirconium dioxide ($ZrO_2$), silicon nitride ($Si_3N_4$), silicon dioxide ($SiO_2$), and silicon oxycarbide (SiOC).

The step of selectively applying the functionalized ceramic particles comprises applying a mixture of the functionalized ceramic particles and a liquid binder into the voids within each ceramic fiber ply.

The liquid binder can be one or more of a polyvinyl alcohol and water mixture and a polyvinyl butyral and ethanol mixture.

The step of densifying the stack of ceramic fiber plies comprises one or more of a chemical vapor infiltration, chemical vapor deposition, melt infiltration, and polymer infiltration and pyrolysis process.

The ceramic fiber plies are formed from silicon carbide fibers.

The following are further non-exclusive descriptions of possible embodiments of the present invention.

A ceramic matrix composite component comprising: a plurality of ceramic fiber plies, wherein each of the plurality of ceramic fiber plies comprises a plurality of interconnected tows; and a plurality of functionalized ceramic particles positioned within voids between adjacent tows of each of the plurality of ceramic fiber plies; wherein the functionalized ceramic particles comprise base ceramic particles coated with a first chemical compound.

The ceramic matrix composite component of the preceding paragraph can optionally include, additionally and/or alternatively, any one or more of the following features, configurations and/or additional components:

The first chemical compound is applied to an exterior of the base ceramic particles through a chemical vapor deposition or chemical vapor infiltration process.

The base ceramic particles can be one or more of silicon carbide, boron carbide, silicon nitride, silicon, carbon, aluminum oxide, and hafnium oxide.

The first chemical compound can be one or more of silicon carbide (SiC), boron nitride (BN), silicon boron nitride (SiBN), carbon (C), boron carbide ($B_4C$), aluminum nitride (AlN), aluminum oxide ($Al_2O_3$), zirconium dioxide ($ZrO_2$), silicon nitride ($Si_3N_4$), silicon dioxide ($SiO_2$), and silicon oxycarbide (SiOC).

The functionalized ceramic particles comprise a second chemical compound applied to an exterior of the first chemical compound through a chemical vapor deposition or chemical vapor infiltration process.

The first chemical compound is a same or different chemical compound than the second chemical compound.

The plurality of functionalized ceramic particles are positioned within the voids by selectively applying a mixture of the functionalized ceramic particles and a liquid binder into the voids within each ceramic fiber ply.

The liquid binder can be one or more of a polyvinyl alcohol and water mixture and a polyvinyl butyral and ethanol mixture.

The plurality of ceramic fiber plies are stacked, debulked, and densified to form the ceramic matrix composite component.

Densifying the stack of ceramic fiber plies comprises one or more of a chemical vapor infiltration, chemical vapor deposition, melt infiltration, and polymer infiltration and pyrolysis process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite component, the method comprising:
    forming a plurality of ceramic fiber plies;
    selectively applying functionalized ceramic particles into voids within each of the plurality of ceramic fiber plies;
    laying up and debulking a stack of the plurality of ceramic fiber plies including the functionalized ceramic particles; and
    subsequently densifying the stack of ceramic fiber plies;
    wherein the functionalized ceramic particles are produced by coating base ceramic particles with a first chemical compound through a chemical vapor deposition or chemical vapor infiltration process;
    wherein the first chemical compound is one or more of silicon carbide (SiC), boron nitride (BN), silicon boron nitride (SiBN), carbon (C), boron carbide ($B_4C$), aluminum nitride (AlN), aluminum oxide ($Al_2O_3$), zirconium dioxide ($ZrO_2$), silicon nitride ($Si_3N_4$), silicon dioxide ($SiO_2$), and silicon oxycarbide (SiOC).

2. The method of claim 1 and further comprising coating the base ceramic particles with a second chemical compound through a chemical vapor deposition or chemical vapor infiltration process.

3. The method of claim 2, wherein the first chemical compound is a same or different chemical compound than the second chemical compound.

4. The method of claim 1, wherein the base ceramic particles are one or more of silicon carbide, boron carbide, silicon nitride, silicon, carbon, aluminum oxide, and hafnium oxide.

5. The method of claim 1, wherein the step of selectively applying the functionalized ceramic particles comprises applying a mixture of the functionalized ceramic particles and a liquid binder into the voids within each ceramic fiber ply.

6. The method of claim 5, wherein the liquid binder is one or more of a polyvinyl alcohol and water mixture and a polyvinyl butyral and ethanol mixture.

7. The method of claim 1, wherein the step of densifying the stack of ceramic fiber plies comprises one or more of a chemical vapor infiltration, chemical vapor deposition, melt infiltration, and polymer infiltration and pyrolysis process.

8. The method of claim 1, wherein the ceramic fiber plies are formed from silicon carbide fibers.

* * * * *

UNITED STATES PATENT AND TRADEMARK OFFICE
CERTIFICATE OF CORRECTION

PATENT NO. : 12,330,994 B2
APPLICATION NO. : 17/390072
DATED : June 17, 2025
INVENTOR(S) : Brendan M. Lenz et al.

It is certified that error appears in the above-identified patent and that said Letters Patent is hereby corrected as shown below:

On the Title Page

Item (72) Inventors should read:
Brendan M. Lenz, North Branford, CT (US); Sarah A. Frith, Layton, UT (US); Olivier H. Sudre, Glastonbury, CT (US); Mark T. Ucasz, Middleton, CT (US)

Signed and Sealed this
Twenty-first Day of October, 2025

John A. Squires
*Director of the United States Patent and Trademark Office*